(12) United States Patent
Choi

(10) Patent No.: US 6,457,056 B1
(45) Date of Patent: Sep. 24, 2002

(54) NETWORK INTERFACE CARD CONTROLLER AND METHOD OF CONTROLLING THEREOF

(75) Inventor: Jong Moon Choi, Inchon-kwangyokshi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/224,266

(22) Filed: Dec. 31, 1998

(30) Foreign Application Priority Data

Aug. 17, 1998 (KR) .......................................... 98-33332

(51) Int. Cl.$^7$ ............................................... G06F 15/16
(52) U.S. Cl. ...................................................... 709/230
(58) Field of Search ................................ 709/230, 228, 709/223; 379/284; 370/401, 465

(56) References Cited

U.S. PATENT DOCUMENTS

| | | | | | |
|---|---|---|---|---|---|
| 4,807,282 A | * | 2/1989 | Kazan et al. | ................ | 379/284 |
| 5,590,285 A | * | 12/1996 | Krause et al. | ............ | 395/200.2 |
| 5,754,552 A | * | 5/1998 | Allmond et al. | ............ | 370/465 |
| 5,758,127 A | * | 5/1998 | MacAulay et al. | .......... | 395/500 |
| 5,838,989 A | * | 11/1998 | Hutchison et al. | .......... | 395/831 |
| 6,122,667 A | * | 9/2000 | Chung | ........................ | 709/228 |
| 6,167,445 A | * | 12/2000 | Gai et al. | .................... | 709/223 |
| 6,172,980 B1 | * | 1/2001 | Flanders et al. | ............ | 370/401 |
| 6,226,680 B1 | * | 5/2001 | Boucher et al. | ............ | 709/230 |

OTHER PUBLICATIONS

Mano, Computer System Architecture, Prentice–Hall, Inc. 1982, p. 39.*

* cited by examiner

*Primary Examiner*—John A. Follansbee
(74) *Attorney, Agent, or Firm*—McKenna Long & Aldridge LLP

(57) ABSTRACT

The present invention relates to a network interface card controller and method of controlling thereof, capable of supporting several types of protocols. The present invention provides an integrated hardware card which supports an interface of several protocols. Thereby, the structure becomes simple and the cost may be reduced.

Figure 1:
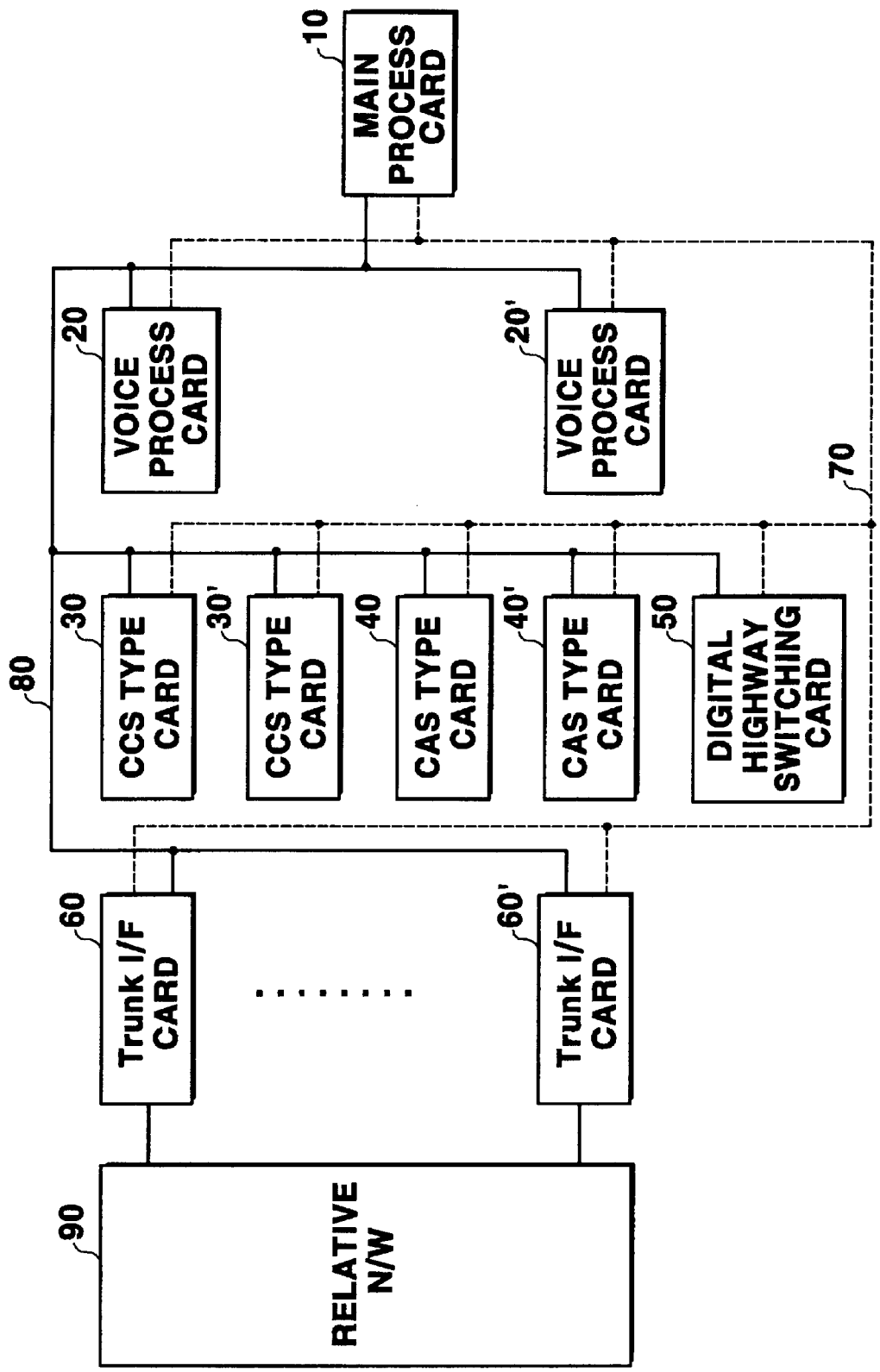

The network interface card(hereinafter, referring to NIC) controller, which is controlled by a central processing unit(CPU) in which a network interface function and a protocol process function are connected to a network, comprising a plurality of protocol process means of respectively providing a several types of protocol for offering any service required from the CPU through a system bus, plurality of network interface means of performing a desired network interface by switching a digital highway according to service types required from the CPU through the system bus, and of performing a digital relay which occupies an empty trunk line, in which the plurality of network interface means are connected to several trunk lines of a physical layer, and call control means of controlling the plurality of protocol means and the plurality of network interface means regardless of protocol types, by exchanging information with an upper application layer, by using a standard interface indicating whether the process succeeds or not about a protocol process request and the requested protocol process result.

14 Claims, 7 Drawing Sheets

NETWORK INTERFACE CARD CONTROLLER AND METHOD OF CONTROLLING THEREOF

BACKGROUND

1. Technical Field

The present invention relates to a network interface card controller and method of controlling thereof. Particularly, the present invention relates to a network interface card controller and method of controlling thereof, capable of supporting several types of protocols by providing an interface which is standardized with an upper application layer in a main process card(hereinafter, referring to MPC).

2. Background

The conventional network interface system has a trunk interface unit and a protocol process unit, physically. Therefore, interface cards comprising the system are different according to each protocol. These interface cards are 4 types according to functions. There are a digital highway switching card, a channel association signaling(CAS) protocol process card, a common channel signaling(CCS) protocol process card, a trunk interface card, and etc. In addition, the system for providing an actual service by using the network interface needs a voice process card of providing voice services(for example, voice message service, Internet phone service, and etc.), and a main process card having an application program for controlling the cards and providing the connection and release of the call. Particularly, the main process card controls each card through a system bus, respectively. And each card is connected to each other through a PCM(pulse code modulation) digital highway. And the trunk interface card may connect at least one trunk lines, which is E1 type, or T1 type.

The conventional network system comprises several cards (30, 30', 40, 40', 60, 60') for charging the network interface, in which the several cards are divided respectively. The application program of a central processing unit(CPU)(a main process card 10 in FIG. 1) controls each card directly in order to provide service by connecting to the network. In other words, each application program connects the call in case that the system uses the CAS protocol process type and the CCS protocol process type by controlling the respective network interface cards(NICs) for connecting single call. Now it will be briefly explained a procedure for generating the call by commanding to the respective NIC in each application program.

First, it is assumed that the system uses the CAS protocol process type. The application program commands a line occupation to trunk interface cards 60, 60' through a system bus 80. And the application program connects a digital highway 70 between the seized line and the CAS protocol process cards 40, 40' by controlling the digital highway switching card 50. And then the application program commands a call number transmission to the CAS protocol process cards 40, 40'. After completing the call number transmission, the CAS protocol process cards 40, 40' reports to the application program that each call is answered from a relative network 90, in case the each call is answered from the relative network 90. The application program connects the digital highway 70 between the voice process cards 20, 20' which are providing the answered line and services by commanding to the digital highway switching card 50. The voice service is finally accomplished by connecting the relative network 90 and the voice process cards 20, 20' through the digital highway 70.

Next, it is assumed that the system uses the CCS protocol process type. First of all, the application program of the main process card 10 connects the digital highway 70 between the trunk signal channel and the CCS protocol process cards 30, 30' by controlling the digital highway switching card 50. And the application program transmits a setup message to the CCS protocol process cards 30, 30'. And then the CCS protocol process cards 30, 30' transmits the answering signal of the network to the application program in the main process card 10.

In case of answering about the call in the network, the CCS protocol process cards 30, 30' transmits whether the cards 30, 30' answers or not, to the application program and the application program connects the digital highway 70 between the voice process cards 20, 20' which provides the answered line and the services by commanding to the digital highway switching card 50.

Figure 2:
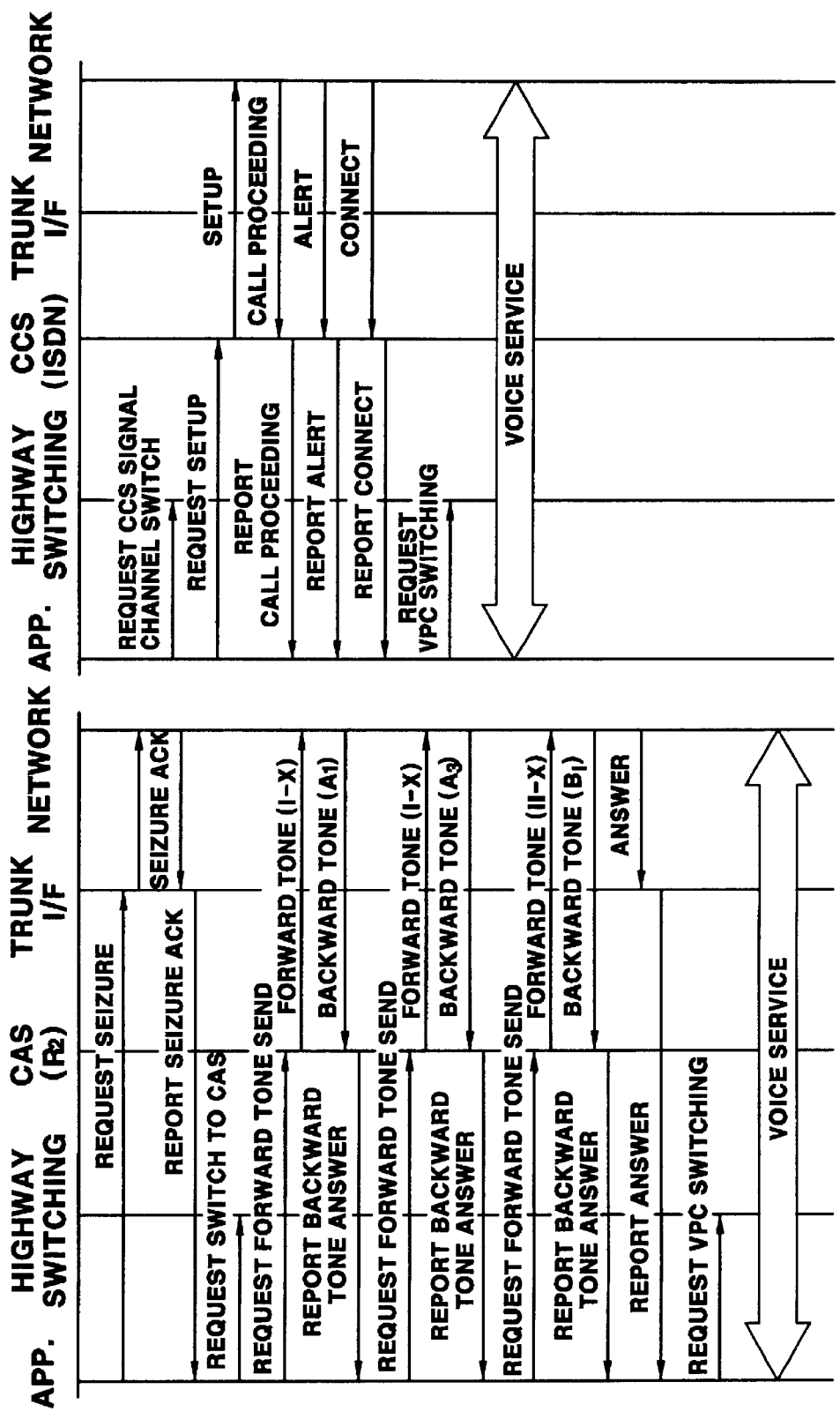

FIG. 2 is an exemplary signal flow chart of a call setting procedure which is carried out about R2 signal in case of the CAS protocol process type and about the ISDN protocol in case of the CCS protocol process type in a conventional NIC. Referring to FIG. 2, a forward tone indicates an information which is generated from a calling party to a received party and a backward tone indicates an information which is generated from the received party to the calling party. And additional I-X, II-X are a Group I and a second Group II of transmitting each subscriber address. And AX, BX . . . indicates an Group A and Group B for transmitting an exchange information(for example, a subscriber grade or a charging format required from the exchange). Accordingly, the forward tones(1-x) indicate the subscriber address which is generated from the calling party to the received party. And a backward tone(A1) indicates the Acknowledge of the received party.

The conventional network system comprises other call process procedures according to each protocol, respectively and the application program in the main process card, cares for an overall call connection procedure.

Accordingly, in case that the application program directly controls various types of protocol, the application program should support functions of each protocol. Therefore, the application program structure becomes complicated, and an internal register is frequently changed according to the function of each protocol whenever the application program carries out the network connection function. As a result, the system extension is more difficult when large numbers of the cards related to the network interface exist.

SUMMARY

Accordingly, in order to solve the problems in the prior art it is an object of the present invention to provide an integrated hardware card which supports an interface of several protocols. Thereby, the structure becomes simple and the cost may be reduced.

To accomplish the object of one embodiment in accordance with the present invention provides a network interface card(hereinafter, referring to NIC) controller, which is controlled by a central processing unit(CPU) in which a network interface function and a protocol process function are connected to a network, comprising plurality of protocol process means of respectively providing a several types of protocol for offering any service required from the CPU through a system bus, plurality of network interface means of performing a desired network interface by switching a digital highway according to service types required from the CPU through the system bus, and of performing a digital relay which occupies an empty trunk line, in which the plurality of network interface means are connected to several trunk lines of a physical layer, and call control means of controlling the plurality of protocol means and the plurality of network interface means regardless of protocol types, by exchanging information with an upper application layer, by using a standard interface indicating whether the process succeeds or not about a protocol process request and the requested protocol process result.

To accomplish the object of one embodiment, the present invention further comprises system interface means of interfacing a NIC initialization command interface which is from the upper application layer in a main process card(MPC) and a command which is from the upper application layer of the MPC to the NIC according to a NIC preparing state between the upper application layer and the call control means, and system initialization means of initiating the plurality of the protocol process means, the network interface means and the call control means with the NIC initialization command from the upper application layer through the system interface means according to the NIC preparing state at the same time.

To accomplish the object of one embodiment in accordance with the present invention, the call control means manages a call process state about a line management of each NIC and a wanted protocol(channel association signaling(CAS) or common channel signaling(CCS) protocol).

To accomplish the object of another embodiment in accordance with the present invention provides a method of controlling a network interface card(NIC), comprising the processes of initializing each network interface means and protocol process means by checking an initialization message which is commanded from an upper application layer in a main process card according to a NIC preparing state, requesting a call process to a corresponding protocol process means after determining a request call process type when the upper application layer requests the call process of a standard interface, and performing the call process according that an answer of the corresponding protocol process means exists or not, and reporting a call process result to the upper application layer by using the standard interface and changing/writing a call process state on a self database.

An each embodiment of the invention is characterized in that the standard interface comprises a setup indication interface of requesting that the upper application layer requests a call to the NIC, in other words, a setup request, and of reporting from the NIC to the upper application layer of the MPC that a new call is requested from the network, a connecting indication interface of requesting that the upper application layer requests a call connection to the NIC, in other words, a connection request, and of reporting that the call is answered in the network from the NIC to the upper application layer, a release indication interface of requesting that the upper application layer requests a call release to the NIC, in other words, a release request, and of reporting that the call is released from the NIC, to the upper application layer, a reset indication interface of requesting that the upper application layer requests a call initialization to the NIC, in other words, a reset request, and of reporting that the call is initialized from the NIC to the upper application layer, and a block indication interface of requesting that the upper application layer requests a channel block to the NIC, in other words, a block request, and of reporting the channel block from the NIC to the upper application layer.

Particularly, in that the standard interface is the CCS protocol, the standard interface further comprises an alert indication interface of requesting that the upper application layer reports a current calling state to the NIC to the network, in other words, an alert request, and of reporting that the current calling state signal is received from the network, from the NIC to the upper application layer.

BRIEF DESCRIPTION

Figure 3:
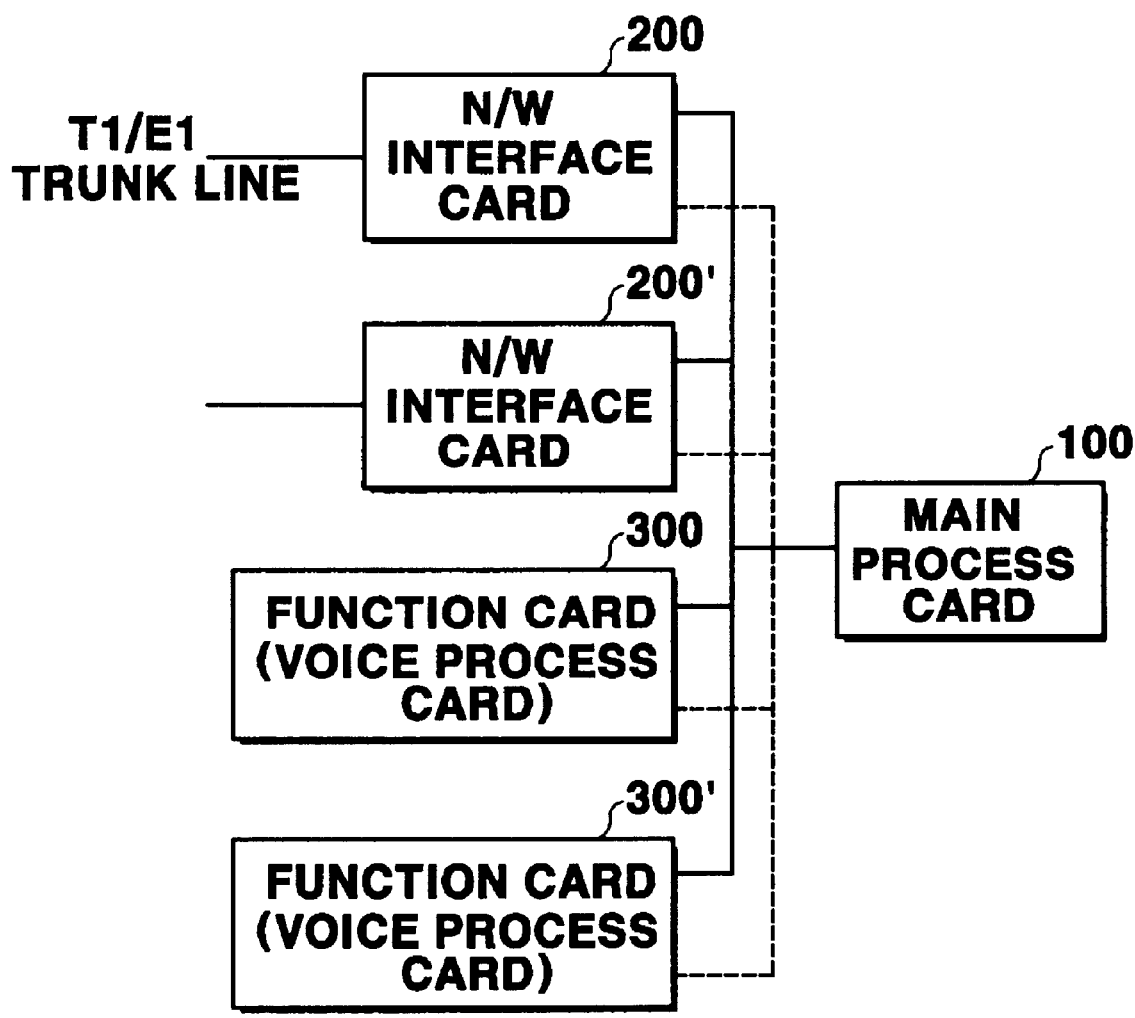
Figure 4:
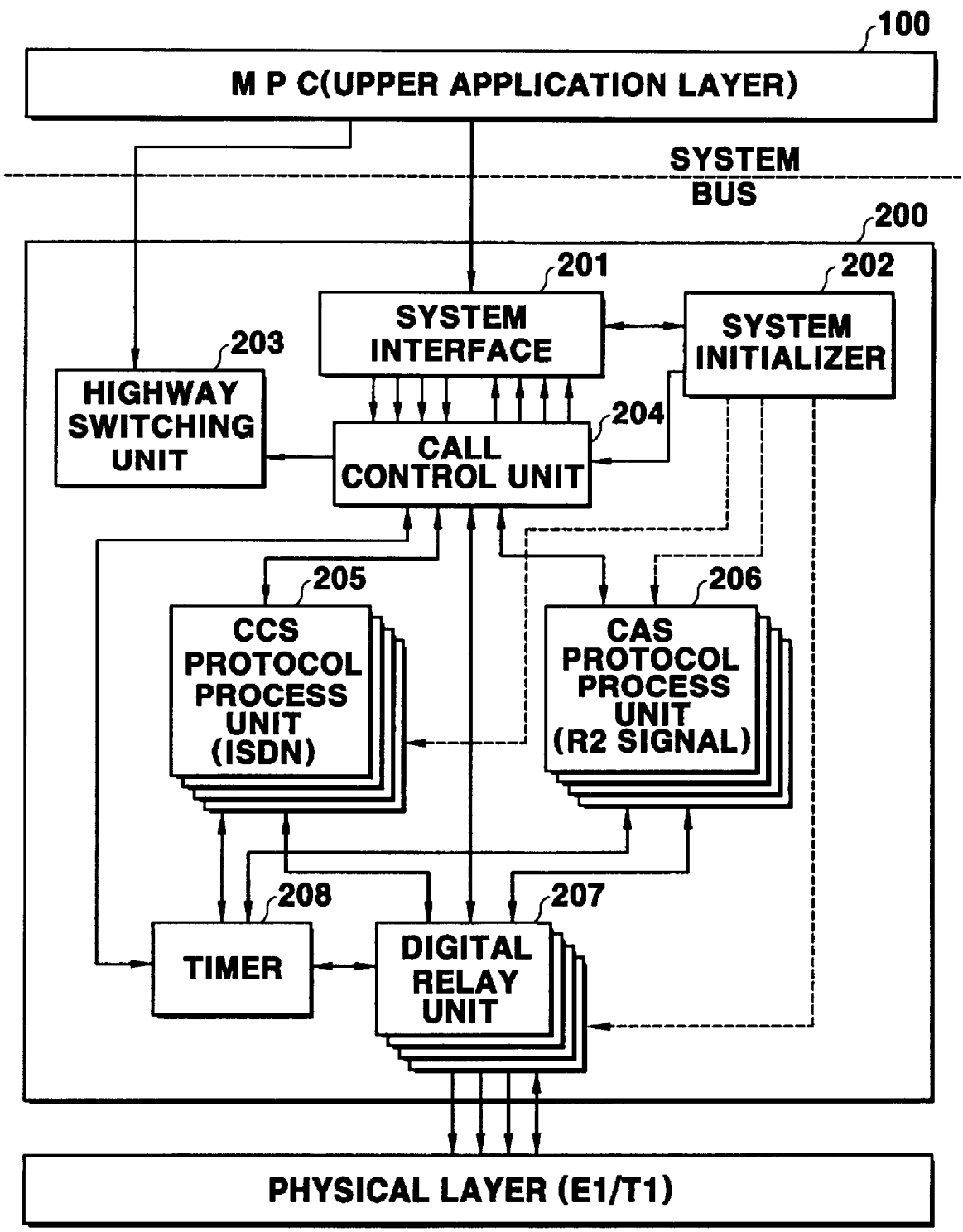
Figure 5A:
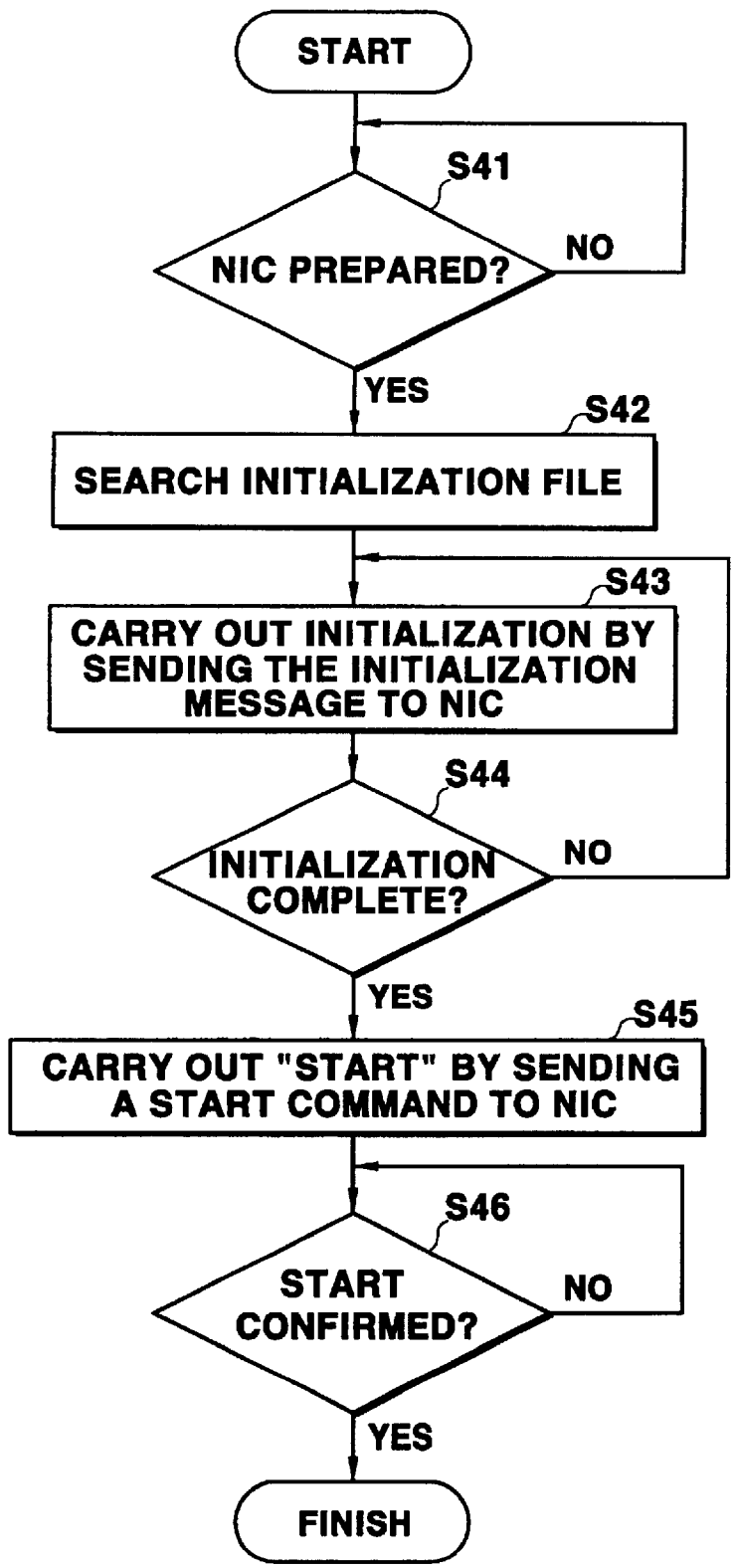
Figure 5B:
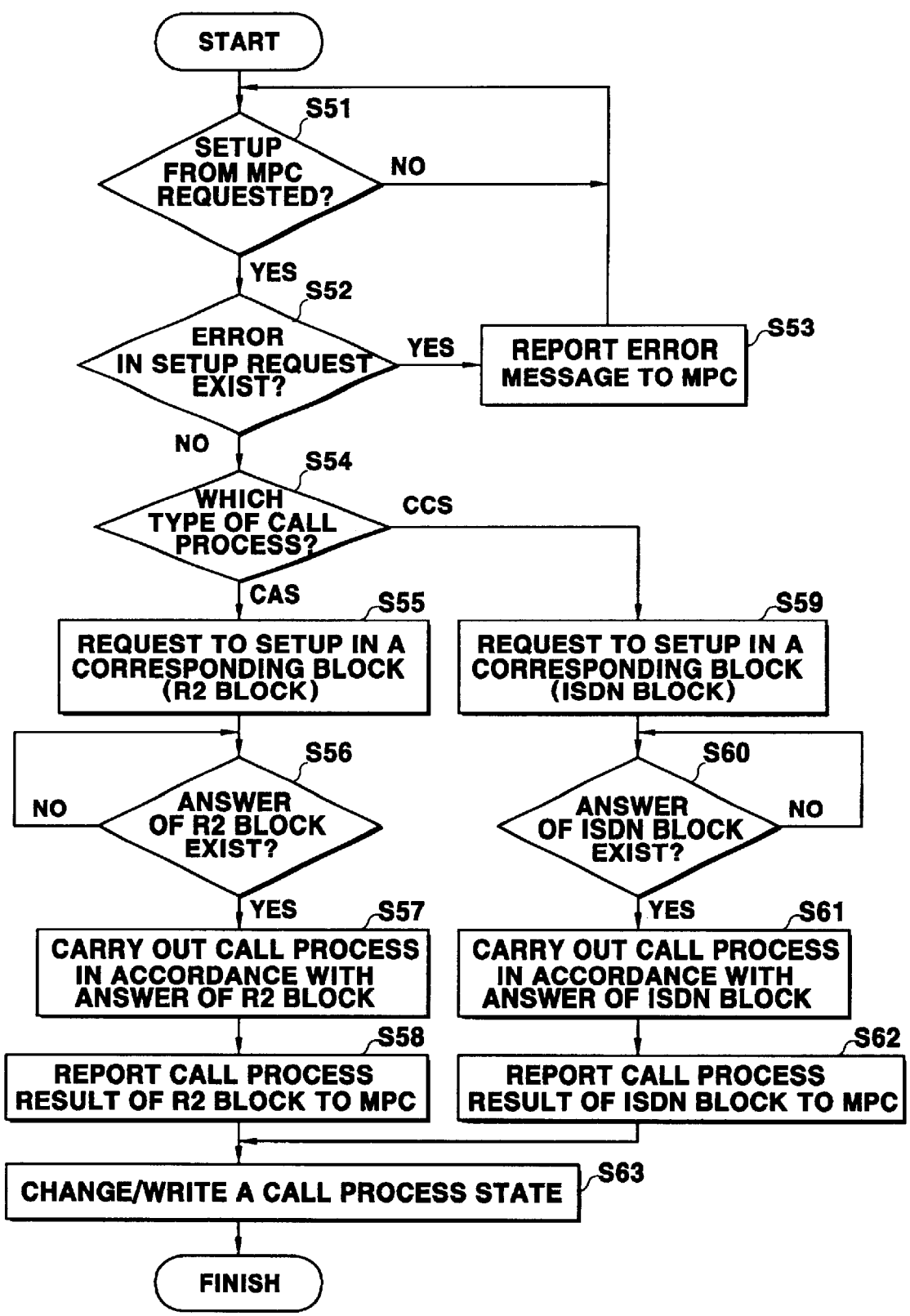
Figure 6:
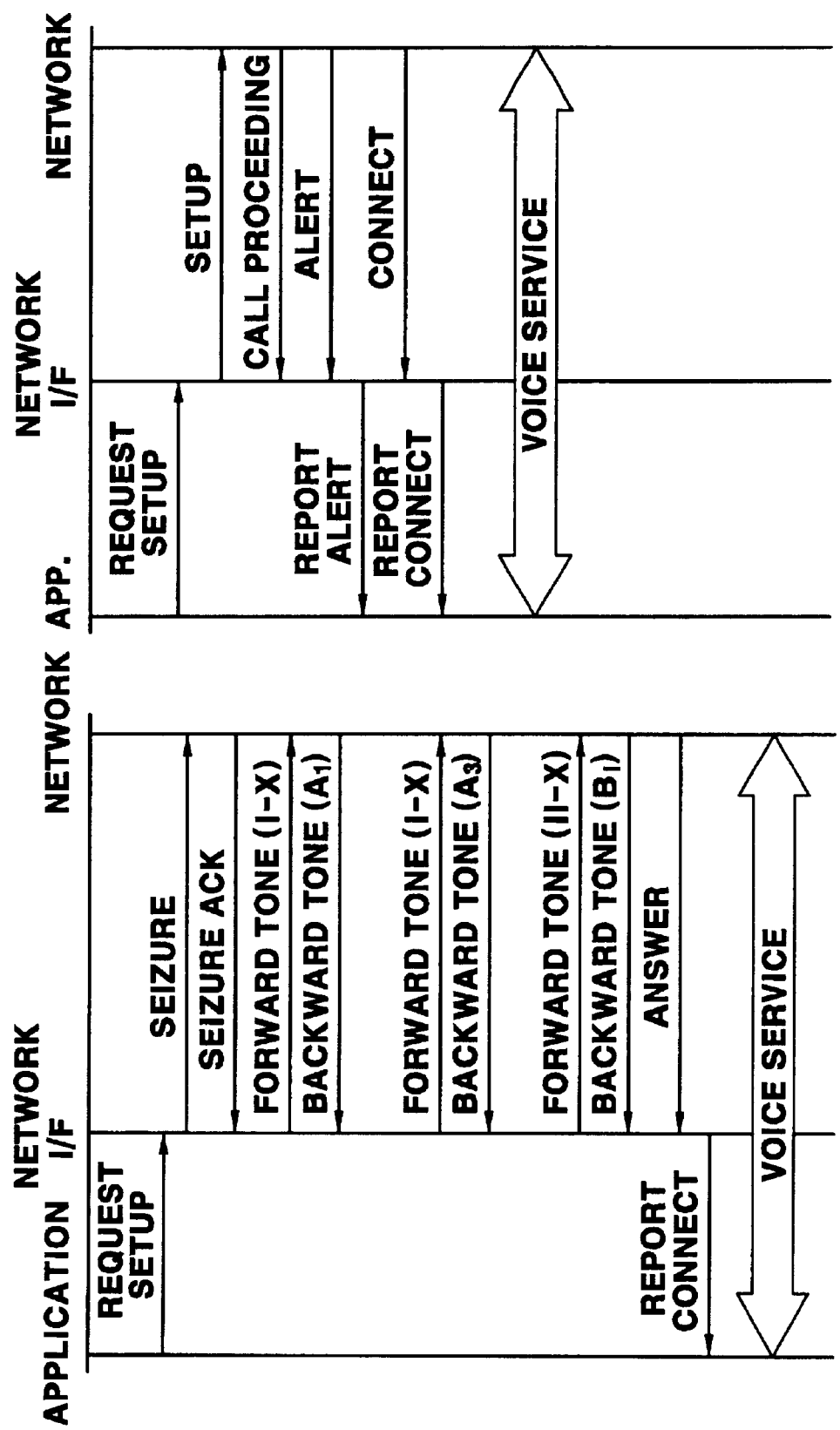

Other objects, features and advantages of the present invention will become more apparent from the following detailed description when read in conjunction with the accompanying drawings, in which:

FIG. 1 is a block diagram about a conventional network interface system,

FIG. 2 is an exemplary signal flow chart of a call setting procedure which is carried out in a conventional network interface system, FIG. 3 is a block diagram of a network interface card controller according to the present invention, FIG. 4 is a block diagram of a network interface card by using a CAS protocol process type and a CCS protocol process type in an embodiment of the present invention, FIG. 5a is an operational flow chart showing a network interface card initialization procedure in the upper application layer of the MPC of FIG. 4, FIG. 5b is an operational flow chart showing a setup procedure by the network interface card of FIG. 4, and FIG. 6 is an exemplary signal flow chart of a call set procedure for explaining a network interface card control method of the present invention.

DETAILED DESCRIPTION OF THE PREFERRED EMBODIMENTS

The network interface card controller and method of controlling thereof in accordance with embodiments of the invention will be described with reference to FIGS. 3 to 6. FIG. 3 shows a block diagram of a network interface card controller according to the present invention. It is composed of a main process card 100 having an upper application program, network interface cards 200, 200' which are controlled by the main process card 100, and function cards (voice process cards) 300, 300'. The function of the network system is decided according to the function cards 300, 300'. And the network connection system according to the present invention has a same structure shown in FIG. 1.

It will be omitted to explain because the function cards 300, 300' use the voice process cards which are the same as the conventional system.

FIG. 4 is a block diagram of a network interface card by using a CAS protocol process type and a CCS protocol process type in an embodiment of the present invention.

Referring to FIG. 4, the present invention comprises a digital highway switching unit 203, a digital relay unit 207, a CAS protocol process unit 206, and a CCS protocol process unit 205 in a single board 200 for performing the network interface and the protocol process respectively in a single card. And it is further comprises a call control unit 204 of controlling the network interface and the protocol process unit and several types of protocols between the upper application layers regardless of protocol types of the network interface and the protocol process unit. The call control unit 204 uses a standard interface indicating whether the process succeeds or not about a protocol process request and the requested protocol process result through the system bus. Here, the call control unit 204 manages a call process state about a line management of each c C and a wanted protocol (channel association signaling (CAS) or common channel signaling (CCS) protocol) and controls an allocation and a release of the trunk channel and has an internal control logic in order to a switching operation about the digital highway.

The present invention further comprises system interface 201 of interfacing a NIC initialization command interface which is from the upper application layer in a main process card(MPC) 100 and a command which is from the upper application layer of the MPC 100 to the NIC according to a NIC preparing state between the upper application layer 100 and the call control unit 204, and system initialization unit 202 of initiating the CCS protocol process unit 205, the CAS protocol process unit 206, a digital relay unit, and the call control unit 204 with the NIC initialization command from the upper application layer 100 through the system interface 201 according to the NIC preparing state at the same time.

Here, the application program of the MPC 100 controls each call of the network interface card(NIC) 200 and provides services by using a standard interface which the NIC 200 provides. The standard interface may be provided as a function or a message type and the standard interface maintains the protocol type of CAS, CCS, and etc., if possible. And therefore, it is possible to use several types of protocols in a signal NIC when the system is extended and the new protocol is added.

FIG. 5a shows an operational flow chart showing a network interface card initialization procedure in the upper application layer of the MPC of FIG. 4. It shows a first process(S41–S46) of initializing each network interface means and protocol process means by checking an initialization message which is commanded from an upper application layer in a main process card according to a NIC preparing state.

FIG. 5b is an operational flow chart showing a setup procedure by the network interface card of FIG. 4. It shows a second process(S51–S57, S59–S61) of requesting a call process to a corresponding protocol process means after determining a request call process type when the upper application layer request the call process(in case of setup request shown in FIG. 5b) of a standard interface, and performing the call process according that an answer of the corresponding protocol process means exists or not, and a third process(S58, S62, and S63) of reporting a call process result to the upper application layer by using the standard interface and changing/writing a call process state on a self database.

FIG. 6 is an exemplary signal flow chart of a call set procedure for explaining a network interface card control method of the present invention. The standard interface about the CAS protocol process which is provided between the call control means and the upper application layer of the MPC, comprises a setup request interface (setup req. (request)) of requesting from the upper application layer of the MPC to the NIC that the upper application layer requests a call to the NIC and a setup indication interface(setup ind.(indication)) of reporting that a new call is requested from the network, an alert request interface(alert req.) of requesting that the upper application layer reports a current calling state to the NIC and an alert indication interface(alert ind.) of reporting that the current calling state signal is received from the network, from the NIC to the upper application layer, a connection request interface(connect req.) of requesting that the upper application layer requests a call connection to the NIC and a connecting indication interface(connect ind.) of reporting that the call is answered in the network from the NIC to the upper application layer, a release request interface(release req.) of requesting that the upper application layer requests a call release to the NIC and a release indication interface(release ind.) of reporting that the call is released from the NIC to the upper application layer, a reset request interface(reset ind.) of requesting that the upper application layer requests a call initialization to the NIC and a reset indication interface(reset ind.) of reporting that the call is initialized from the NIC to the upper application layer, and a block request interface(block req.) of requesting that the upper application layer requests a channel block to the NIC and a block indication interface(block ind.) of reporting the channel block from the NIC to the upper application layer.

Now it will be explained about the operation and the effect of the present invention comprised of each step.

First, referring to FIG. 4, FIG. 5a, and FIG. 5b, the operation of the present invention will be explained in accordance with a procedure, in which a call is generated in an application program by using a standard interface provided from the NIC 200.

The application program commands that the CCS protocol process unit 205 and the CAS protocol process unit 206 set the call through the system interface 201 commonly. The NIC 200 occupies a line which is not currently used, sends a setup message or a line seizing signal, and waits an answering signal of the network system.

When the network system answers about each call, the NIC 200 sends the answering signal to the application program in the MPC 100. The application program receives the answering signal of the network system and controls the function cards(voice process cards) 300, 300' through the line which is occupied by the NIC 200. The voice service is performed that the application program controls the function cards(voice process cards) 300, 300'.

For example, the CCS protocol is almost same as the CAS protocol except adding a procedure which transmits a message to the application program in case of receiving the call processing message from the network system during the NIC 200 occupies the line and waits for the answering signal of the network system.

To add the above process in the CCS protocol process unit 205, a software of the NIC 200 requires a call control unit 204. The call control unit 204 controls and manages the call process state about the CAS protocol process unit 205 and the CCS protocol process unit 206. And the call control unit 204 manages a source such as a NIC lines, call state and the line state of a trunk line and a channel unit. And the call control unit 204 carries out allocation and release of the trunk line channel if required. And the call control unit 204 also provides a several types of the protocols by processing a switching operation of the digital highway.

There are advantages that the present invention provides more services than before because the application program has less load about the call process as well as the system has a higher degree of an integration by integrating the 4 types of NIC to one, which is different from the conventional NIC. And it is easy to change the system because the application program is not changed largely even though the extra protocols are added.

The present invention is not limited to the specifically disclosed embodiments, and variations and modifications may be made without departing from the scope of the present invention.

What is claimed is:

1. A network interface card (hereinafter, referring to NIC) controller, which is controlled by a central processing unit (CPU) in which a network interface function and a protocol process function are connected to a network, comprising:

plurality of protocol process means of respectively providing a several types of protocol for offering any service required from the CPU through a system bus;

plurality of network interface means of performing a desired network interface by switching a digital highway according to service types required from the CPU through the system bus, and of performing a digital relay which occupies an empty trunk line, in which the plurality of network interface means are connected to several trunk lines of a physical layer;

call control means of controlling the plurality of protocol means and the plurality of network interface means regardless of protocol types, by exchanging information with an upper application layer, by using a standard interface indicating whether the process succeeds or not about a protocol process request and the requested protocol process result; and system interface means of interfacing a NIC initialization command interface which is from the upper application layer in a main process card (MPC) and a command which is from the upper application layer of the MPC to the NIC according to a NIC preparing state between the upper application layer and the call control means.

2. A network interface card (hereinafter, referring to NIC) controller, which is controlled by a central processing unit (CPU) in which a network interface function and a protocol process function are connected to a network, comprising:

plurality of protocol process means of respectively providing a several types of protocol for offering any service required from the CPU through a system bus;

plurality of network interface means of performing a desired network interface by switching a digital highway according to service types required from the CPU through the system bus, and of performing a digital relay which occupies an empty trunk line, in which the plurality of network interface means are connected to several trunk lines of a physical layer;

call control means of controlling the plurality of protocol means and the plurality of network interface means regardless of protocol types, by exchanging information with an upper application layer, by using a standard interface indicating whether the process succeeds or not about a protocol process request and the requested protocol process result;

system interface means of interfacing a NIC initialization command interface which is from the upper application layer in a main process card (MPC) and a command which is from the upper application layer of the MPC to the NIC according to a NIC preparing state between the upper application layer and the call control means; and system initialization means of initiating the plurality of the protocol process means, the network interface means and the call control means with the NIC initialization command from the upper application layer through the system interface means according to the NIC preparing state at the same time.

3. A network interface card (hereinafter, referring to NIC) controller, which is controlled by a central processing unit (CPU) in which a network interface function and a protocol process function are connected to a network, comprising:

plurality of protocol process means of respectively providing a several types of protocol for offering any service required from the CPU through a system bus;

plurality of network interface means of performing a desired network interface by switching a digital highway according to service types required from the CPU through the system bus, and of performing a digital relay which occupies an empty trunk line, in which the plurality of network interface means are connected to several truck lines of a physical layer;

call control means of controlling the plurality of protocol means and the plurality of network interface means regardless of protocol types, by exchanging information with an upper application layer, by using a standard interface indicating whether the process succeeds or not about a protocol process request and the requested protocol process result;

wherein a standard interface about the CAS protocol process which is provided between the call control means and the upper application layer of the MPC, comprises:

a setup request interface of requesting from the upper application layer of the MPC to the NIC that the upper application layer requests a call to the NIC and a setup indication interface of reporting that a new call is requested from the network;

a connection request interface of requesting that the upper application layer requests a call connection to the NIC and a connecting indication interface of reporting that the call is answered in the network from the NIC to the upper application layer;

a release request interface of requesting that the upper application layer requests a call release to the NIC and a release indication interface of reporting that the call is released from the NIC to the upper application layer;

a reset request interface of requesting that the upper application layer requests a call initialization to the NIC and a reset indication interface of reporting that the call is initialized from the NIC to the upper application layer; and a block request interface of requesting that the upper application layer requests a channel block to the NIC and a block indication interface of reporting the channel block from the NIC to the upper application layer.

4. A network interface card (hereinafter, referring to NIC) controller, which is controlled by a central processing unit (CPU) in which a network interface function and a protocol process function are connected to a network, comprising:

plurality of protocol process means of respectively providing a several types of protocol for offering any service required from the CPU through a system bus;

plurality of network interface means of performing a desired network interface by switching a digital highway according to service types required from the CPU through the system bus, and of performing a digital relay which occupies an empty trunk line, in which the plurality of network interface means are connected to several trunk lines of a physical layer;

call control means of controlling the plurality of protocol means and the plurality of network interface means regardless of protocol types, by exchanging information with an upper application layer, by using a standard interface indicating whether the process succeeds or not about a protocol process request and the requested protocol process result;

wherein a standard interface about the CAS protocol process which is provided between the call control means and the upper application layer of the MPC, comprises:

a setup request interface of requesting from the upper application layer of the MPC to the NIC that the upper application layer requests a call to the NIC and a setup indication interface of reporting that a new call is requested from the network;

an alert request interface of requesting that the upper application layer reports a current calling state to the NIC and an alert indication interface of reporting the current calling state signal is received from the network, from the NIC to the upper application layer;

a common request interface of requesting that the upper application layer requests a call connection to the NIC and a connecting indication interface of reporting that the call is answered in the network from the NIC to the upper application layer;

a release request interface of requesting that the upper application layer requests a call release to the NIC and a release indication interface of reporting that the call is released from the NIC to the upper application layer;

a reset request interface of requesting that the upper application layer requests a call initialization to the NIC and a reset indication interface of reporting that the call is initialized from the NIC to the upper application layer; and a block request interface of requesting that the upper application layer requests a channel block to the NIC and a block indication interface of reporting the channel block from the NIC to the upper application layer.

5. A method of controlling a network interface card(NIC), comprising the processes of:

initializing each network interface means and protocol process means by checking an initialization message which is commanded from an upper application layer in a main process card according to a NIC preparing state, requesting a call process to a corresponding protocol process means after determining a request call process type when the upper application layer requests the call process of a standard interface, and performing the call process according that an answer of the corresponding protocol process means exist or not, and reporting a call process result to the upper application layer by using the standard interface and changing/writing a call process state on a self database.

6. A method of controlling a network interface card(NIC) according to claim 5, the initializing process comprises the steps of:

determining the NIC preparing state, searching an initialization file when the NIC preparing state is confirmed, carrying out an initialization of a network interface card and protocol process cards by sending the searched initialization file to the NIC and waiting until an initialization completing signal is answered from the NIC, and determining a start confirmation by sending a start command to the initialized NIC and finishing an initialization process.

7. A method of controlling a network interface card(NIC) according to claim 5, the requesting/performing the call process comprises the steps of:

determining whether the upper application layer requests the call process according to the standard interface, requesting the call process to a corresponding protocol process means after determining a call process type in case that the request call process has no error, and performing the call process according that the corresponding protocol process means answers or not.

8. A method of controlling a network interface card(NIC) according to claim 5, the reporting and changing/writing process comprises the steps of:

reporting the call process result to the upper application layer by using the standard interface, and changing/writing the call process state on the self database.

9. A method of controlling a network interface card(NIC) according to claim 5, wherein a standard interface about the CAS protocol process which is provided between the call control means and the upper application layer of the MPC, comprises:

a setup request interface of requesting from the upper application layer of the MPC to the NIC that the upper application layer requests a call to the NIC and a setup indication interface of reporting that a new call is requested from the network, a connection request interface of requesting that the upper application layer requests a call connection to the NIC and a connecting indication interface of reporting that the call is answered in the network from the NIC to the upper application layer, a release request interface of requesting that the upper application layer requests a call release to the NIC and a release indication interface of reporting that the call is released from the NIC to the upper application layer, a reset request interface of requesting that the upper application layer requests a call initialization to the NIC and a reset indication interface of reporting that the call is initialized from the NIC to the upper application layer, and a block request interface of requesting that the upper application layer requests a channel block to the NIC and a block indication interface of reporting the channel block from the NIC to the upper application layer.

10. A method of controlling a network interface card (NIC) according to claim 5, wherein a standard interface about the CAS protocol process which is provided between the call control means and the upper application layer of the MPC, comprises:

a setup request interface of requesting from the upper application layer of the MPC to the NIC that the upper application layer requests a call to the NIC and a setup indication interface of reporting that a new call is requested from the network, an alert request interface of requesting that the upper application layer reports a current calling state to the NIC and an alert indication interface of reporting that the current calling state signal is received from the network, from the NIC to the upper application layer, a connection request interface of requesting that the upper application layer requests a call connection to the NIC and a connecting indication interface of reporting that the call is answered in the network from the NIC to the upper application layer, a release request interface of requesting that the upper application layer requests a call release to the NIC and a release indication interface of reporting that the call is released from the NIC to the upper application layer, a reset request interface of requesting that the upper application layer requests a call initialization to the NIC and a reset indication interface of reporting that the call is initialized from the NIC to the upper application layer, and a block request interface of requesting that the upper application layer requests a channel block to the NIC and a block indication interface of reporting the channel block from the NIC to the upper application layer.

11. A network interface card (NIC), comprising:

a plurality of protocol process units, each for enabling a predetermined communication protocol, wherein input communication signals are manipulated into generated protocol signals in accordance with said predetermined communication protocol;

a call control unit for receiving information from a main process card (MPC) and for sending said received information as input communication signals to a selected protocol process unit determined by a call process state contained in the input communication signals, said call control unit further for producing a switching control signal;

a digital relay unit for applying generated protocol signals to a selected one of a plurality of physical layer lines in response to said switching control signal; and a system interface for receiving signals from a main process card (MPC) and for applying said received signals as input communication signals;

wherein said system interface is further for providing initialization commands to a system initializer, wherein said system initializer initiates the plurality of protocol process units, the digital relay unit, and the call control unit in response to signals from the main process card (MPC).

12. A network interface card (NIC), comprising:

a plurality of protocol process units, each for enabling a predetermined communication protocol, wherein input communication signals are manipulated into generated protocol signals in accordance with said predetermined communication protocol;

a call control unit for receiving information from a main process card (MPC) and for sending said received information as input communication signals to a selected protocol process unit determined by a call process state contained in the input communication signals, said call control unit further for producing a switching control signal;

a digital relay unit for applying generated protocol signals to a selected one of a plurality of physical layer lines in response to said switching control signal; and a system interface for receiving signals from a main process card (MPC) and for applying said received signals as input communication signals;

wherein said system interface is further for providing initialization commands to a system initializer, wherein said system initializer initiates the plurality of protocol process units, the digital relay unit, and the call control unit in response to signals from the main process card (MPC);

wherein the initiating is done according to a network interface card (NIC) preparing state and the initiating of said units occurs simultaneously.

13. A network interface card (NIC) controller, comprising:

a main process unit having a programmable controller for producing commands on a bus line in response to a software program, said main process unit further for receiving inputs on said bus line;

a network interface card electrically connected to said bus line, said network interface card including:

a plurality of protocol process units, each for enabling a predetermined communication protocol, wherein input communication signals are manipulated into generated protocol signals in accordance with said predetermined communication protocol;

a call control unit for receiving information from a main process card (MPC) and for sending said received information as input communication signals to a selected protocol process unit determined by a call process state contained in the input communication signals, said call control unit further for producing a switching control signal;

a digital relay unit for applying generated protocol signals to a selected one of a plurality of physical layer lines in response to said switching control signal; and a system interface for receiving signals from a main process card (MPC) and for applying said received signals as input communication signals;

wherein said system interface is further for providing initialization commands to a system initializer, wherein said system initializer initiates the plurality of protocol process units, the digital relay unit, and the call control unit in response to signals from the main process card (MPC).

14. A network interface card (NIC) controller, comprising:

a main process unit having a programmable controller for producing commands on a bus line in response to a software program, said main process unit further for receiving inputs on said bus line;

a network interface card electrically connected to said bus line, said network interface card including:

a plurality of protocol process units, each for enabling a predetermined communication protocol, wherein input communication signals are manipulated into generated protocol signals in accordance with said predetermined communication protocol; a call control unit for receiving information from a main process card (MPC) and for sending said received information as input communication signals to a selected protocol process unit determined by a call process state contained in the input communication signals, said call control unit further for producing a switching control signal;

a digital relay unit for applying generated protocol signals to a selected one of a plurality of physical layer lines in response to said switching control signal; and a system interface for receiving signals from a main process card (MPC) and for applying said received signals as input communication signals;

wherein said system interface is further for providing initialization commands to a system initializer, wherein said system initializer initiates the plurality of protocol process units, the digital relay unit, and the call control unit in response to signals from the main process card (MPC); and wherein the initiating is done according to a network interface card (NIC) preparing state and the initiating of said units occurs simultaneously.

* * * * *